United States Patent [19]

Uenohara

[11] Patent Number: 5,598,912
[45] Date of Patent: Feb. 4, 1997

[54] RELEASE COUPLING FOR A CLUTCH RELEASE MECHANISM

[75] Inventor: Norihisa Uenohara, Ibaraki, Japan

[73] Assignee: Kabushiki Kaisha Daikin Seisakusho, Osaka, Japan

[21] Appl. No.: 455,817

[22] Filed: May 31, 1995

[51] Int. Cl.$^6$ .......................... F16D 23/14; F16D 25/08
[52] U.S. Cl. .................... 192/91 A; 192/85 CA; 192/98; 192/DIG. 1; 192/70.13
[58] Field of Search .................... 192/91 A, 85 CA, 192/98, 89.24, DIG. 1, 70.13

[56] References Cited

U.S. PATENT DOCUMENTS

| | | | |
|---|---|---|---|
| 4,923,044 | 5/1990 | Gay et al. | 192/98 |
| 5,183,141 | 2/1993 | Abe et al. | 192/98 X |
| 5,398,796 | 4/1995 | Doremus | 192/85 CA |

Primary Examiner—Vinh T. Luong
Assistant Examiner—Saul Rodriquez
Attorney, Agent, or Firm—Shinjyu Office of Patent Attorneys

[57] ABSTRACT

The present invention is directed to enhancing workability in attachment and detachment of a clutch release bearing from a clutch release mechanism. A release coupling device is provided on an outer circumference of a transmission input shaft extending toward a clutch for coupling a clutch release bearing and a bearing drive mechanism. The device includes an inner cover 19 and an inner cylinder 30. The inner cover 19 is provided in the outer circumference of the shaft so as to be fixed thereto close to a diaphragm spring and has first convex portions 19b in its inner circumferential surface. The inner cylinder 30 is inserted in the inner cover 19 and has second convex portions 30c in its outer circumferential surface so that they come in contact with the first convex portion s 19b in close proximity to the clutch.

20 Claims, 8 Drawing Sheets

RELEASE COUPLING FOR A CLUTCH RELEASE MECHANISM

BACKGROUND OF THE INVENTION

A) Field of the Invention

The present invention relates to a release coupling apparatus, and more particularly, it relates to a release coupling apparatus used with a clutch release bearing and a release bearing drive mechanism.

B) Description of the Prior Art

A typical clutch assembly is disposed between a flywheel of an engine and a transmission in an automotive vehicle. Such a clutch assembly includes a clutch disc, a clutch cover and a pressure plate disposed within the clutch cover. A diaphragm spring is disposed within the clutch cover biases the pressure plate toward the flywheel engaging the clutch disc disposed between the pressure plate and the flywheel for engagement of the clutch. In a pull-type clutch assembly, an inner circumferential portion of the diaphragm spring is moved toward the transmission by a clutch release mechanism to disengage the clutch disc for dis-engagement of the clutch.

Such a clutch release mechanism used in the pull-type clutch includes a release bearing and a drive mechanism. The release bearing is typically disposed for axial movement about the input shaft of the transmission. The drive mechanism moves the release bearing in axial directions along a portion of the length of the transmission input shaft. One race of the release bearing engages, for example, with an inner circumferential end of a diaphragm spring. The drive mechanism may be a cable actuated lever or may be a hydraulically actuated configuration.

The release bearing and the drive mechanism are usually coupled together via a clip wire or a wedge collar. The clip wire is often retained in, for instance, a groove which is formed in a portion of the drive mechanism.

In prior art clutch release apparatuses, it has found to be difficult engaging and disengaging a release bearing from the associated drive mechanism, such as a hydraulic cylinder. Specifically, for the engagement and disengagement of the drive mechanism from the release bearing, some instrument or special tool is often necessary to get the cylinder of the drive mechanism out. This brings about extra necessity of attaching and detaching the instrument. In addition, upon removing the clip wire and wedge collar from the cylinder of the drive mechanism, it is necessary to use a punch or press to push the wedge collar out of the cylinder. This is a difficult, time consuming and aggravating work.

SUMMARY OF THE INVENTION

Accordingly, it is an object of the present invention to enhance operability of an element provided in a pressing element of a clutch and an element provided in a drive mechanism in engagement and disengagement of them.

The present invention provides a release coupling apparatus disposed around an outer circumference of a transmission input shaft for engaging a clutch release bearing with a release bearing drive mechanism and which has an-annular element and a cylindrical element. The annular element is attached to a release bearing and has a first projection formed on an inner circumferential surface. The cylindrical element can be coupled to the drive mechanism, and is at least partially inserted in the annular element, having a second projection formed in an outer circumference so as to contact the first projection.

Preferably, there are more than one of the first projection and second projection in circular directions, respectively. Further preferably, gaps between adjacent ones of the second projections are larger than widths of the first projections in circular directions.

It is preferable that at an end of an outer circumferential surface of the cylindrical element is provided with a surface smaller in diameter than other element and having the second projection close to the clutch, and the first projections are disposed between the second projections and an end of the surface the cylindrical element.

Preferably, the device further includes an annular coupling element which is placed in an outer circumference of the cylindrical element and which engages the annular element so as not to move relative to it. The coupling element has preferably has an operating element extending outward in a radial direction. The coupling element may have an annular element placed in an outer circumference of the cylindrical element and a plurality of guides extending from the annular element toward the clutch and extend in gaps in circular directions between adjacent ones of the first projections for guiding the first projections in gaps in the circular directions between adjacent ones of the second projections. Preferably, the guides have their respective distal ends shaped narrower in circular directions than their proximal ends. In inner circumferential surfaces of the guides, third projections may be formed so that they are put in gaps in axial directions between the second projections and the end of the small surface of the cylindrical element. The third projections preferably have inclined surfaces at one of their ends in one of circular directions so that they become smaller in width in axial directions as they go outward in circular directions.

The device preferably includes a restricting element for restricting relative movement between the coupling element and the cylindrical element. The restricting element may be a wedge element interposed between an inner circumferential surface of the annular element of the coupling element and the outer circumferential surface of the cylindrical element.

The device preferably further includes a cylindrical fixing element provided in an inner circumferential side of the annular element, and the annular element and the fixing element respectively have portions which engage with each other so that they are put in first positions in circular directions where the guides of the annular element are disposed between the second projections in the circular directions and second positions in circular directions corresponding to positions of the second projections. The engaging portions preferably allow the annular element to move between the first and second positions in the circular directions relative to the fixing element and prevent it from moving beyond the first and second positions in the circular directions. The engaging portions on both sides may include a single projection extending inward in a radial direction from an end of the annular element close to the transmission and a pair of grooves which are formed in an outer circumferential surface of the cylindrical fixing element at specified angle apart from each other in circular directions, extending in axial directions. Preferably, on opposite sides in circular directions of the projection in the annular element, slits are formed, extending from its end close to the transmission in axial directions. The pair of the grooves may be provided with inclined portions in positions opposed to each other in circular directions so that the projections can extend beyond the grooves.

A clutch release mechanism according to the present invention is an apparatus which is placed in an outer circumference of a shaft extending from a transmission toward a clutch and which moves a pressing element of the clutch toward the transmission to release the clutch, and device includes a release bearing, a release coupling device and a drive mechanism. The release bearing is coupled to the pressing element. The release coupling device can be attached to the release bearing and includes an annular element having a first projection formed in its inner circumferential surface, and a cylindrical element which is fitted in the annular element and has a second projections formed in its outer circumferential surface so as to come in contact with the first projections close to the clutch. The drive mechanism is for driving the cylindrical element in axial directions.

The drive mechanism is preferably a hydraulic cylinder device which further includes an annular oil chamber provided in an outer circumference of the shaft and extending in axial directions and drive the cylindrical element in the axial directions. The cylindrical element may constitute an inner circumferential wall of the oil chamber.

In a release coupling device according to the present invention, when a release bearing drive mechanism causes a cylindrical element to move toward a transmission, a second projections urges a first projections so that the first projections causes an annular element to move toward the transmission. This results in a release bearing moving toward the transmission to cause disengagement of a clutch.

Engagement of the first projection and the second projection allows the first projection in the annular element to come in contact with the second projection of the cylindrical element close to the clutch. In this way, attachment and detachment operations are facilitated, and workability is enhanced.

In the event of having a plurality of the first projection and second projections formed in circular directions, the annular element is relatively moved in axial directions to cause the first projections to be put in gaps in circular direction between adjacent ones of the second projections and the annular element is further relatively rotated to bring the first projections in contact with the second projections close to the transmission. For disengagement, the operation may be done in reverse procedure. In this case, the workability is further enhanced since the device can be attached and detached simply by relatively moving the annular element in axial directions and then turning it. In the event that each of the gaps between the second projections in circular directions is larger than a width in circular directions of each of the projections, workability in attaching and detaching the device is enhanced because the first projections can easily pass the gaps in the circular directions between the second projections.

In the event that the first projections are disposed between the second projections and an end of a small surface of the cylindrical element, rattle of the cylindrical element and the annular element in the axial directions is prevented.

In the event of further including an annular coupling element which engages the annular element so as not to rotate relative to each other, the coupling element facilitates rotation of the annular element, and therefore, there is no need of forming an extra element such as a projection in the annular element. In the event that the coupling element has an operating element which extends outward in a radial direction, a rotating operation of the annular element by the coupling element is facilitated. In the event that the coupling element has a plurality of guides, the first projections are smoothly guided into the gaps in the circular directions between adjacent ones of the second projections. This enhances workability in assembling the device. In the event that the guides have their respective distal ends shaped narrower in circular directions than their respective proximal ends, the first projections are more smoothly guided into the gaps in the circular directions between the second projections. In the event that third projections are formed in inner circumferential surfaces of the guides, fitting the projections in gaps in axial directions between the second projections and the end of the small surface permits the coupling element and the cylindrical element to be put in position in the axial directions. This leads to enhancement workability in attaching and detaching the device.

In the event that the third projections have inclined surfaces at their respective one ends in one of circular directions, turning the coupling element for disengagement causes the inclined surfaces of the third projections to be in contact with the second projections, so that the third projections are smoothly put in the gaps in the axial directions between the second projections and the end of the small surface. In this way, workability in detachment is enhanced.

A position in axial directions of the annular element varies in one direction as abrasion of a friction element of a clutch disc advances hence, the coupling element and the cylindrical element must be fixed in their respective positions in the axial directions upon disengagement of the device.

In the event of further including a restricting element which restricts movement of the coupling element and the cylindrical element in the axial directions, the coupling element can be fixed to the cylindrical element in the axial directions since relative movement in the axial directions of the coupling element and the cylindrical element is restricted. In the event that the restricting element is a wedge element, relative movement in the axial directions between the coupling element and the cylindrical element can be restricted or be released from restriction.

In the event that the device further includes a cylindrical fixing element and that the annular element and the fixing element engage with each other so that guides of the annular element may be arranged in first and second positions in circular directions, the first projections interposed between adjacent ones of the guides are brought in gaps between adjacent ones in circular direction of the second projections to be disengaged from the second projections when the annular element is moved from the first position to the second position in disassembling the device. In assembling the device, the annular element is put in the second position, and thereafter, the first projections in the annular element are inserted in axial directions in gaps between adjacent ones of the first projections in the circular directions. Under the circumstances, the first projections smoothly pass the gaps between adjacent ones of the projections in the circular directions. When the annular element is turned to the second position, the first projections are disposed between the second projections and the end. As has been described, shifting the annular element between the first and second positions facilitates engaging and disengaging operations. In the event that engagement allows the annular element to move between the first and second positions in the circular directions relative to the fixed element and that it prevents the annular element from moving beyond the first and second positions in the circular directions, good workability is attained since the annular element keeps a track between the first and second positions. In the event that the engagement is attained by mating a single projection in the annular element and a pair of grooves in the cylindrical fixing element, the projection moves between the pair of the grooves in circular directions. This enhances workability with a simple configuration, In the event that slits extending from an end surface close to the transmission in axial directions are formed on opposite sides of the projection in the circular directions, the projection elastically transforms as it going out of the pair of the groves moves on the cylindrical fixing element. In the event that inclined surfaces are formed on one of walls of the grooves opposed to each other so that the projection can proceed the grooves, the annular element can easily move between the first and second positions.

In a clutch release mechanism according to the present invention, when a release bearing drive mechanism causes a cylindrical element to move toward a transmission, a second projection urges a first projection so that the first projection causes an annular element to move toward the transmission. This results in a release bearing moving toward the transmission to cause disengagement of a clutch. Engagement of the first projection and second convex projections brings a first projection in the annular element in contact with a second projection in the cylindrical element close to the clutch. This facilitates attachment and detachment of the device and enhances workability.

In the event of employing a hydraulic cylinder device as a drive mechanism, the hydraulic cylinder device causes the cylindrical element in axial directions to release the clutch. In the event that the cylindrical element constitutes an inner circumferential wall in an oil chamber, a dimension in a radial direction of the clutch release mechanism can be diminished.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE PREFERRED EMBODIMENT

Figure 1:
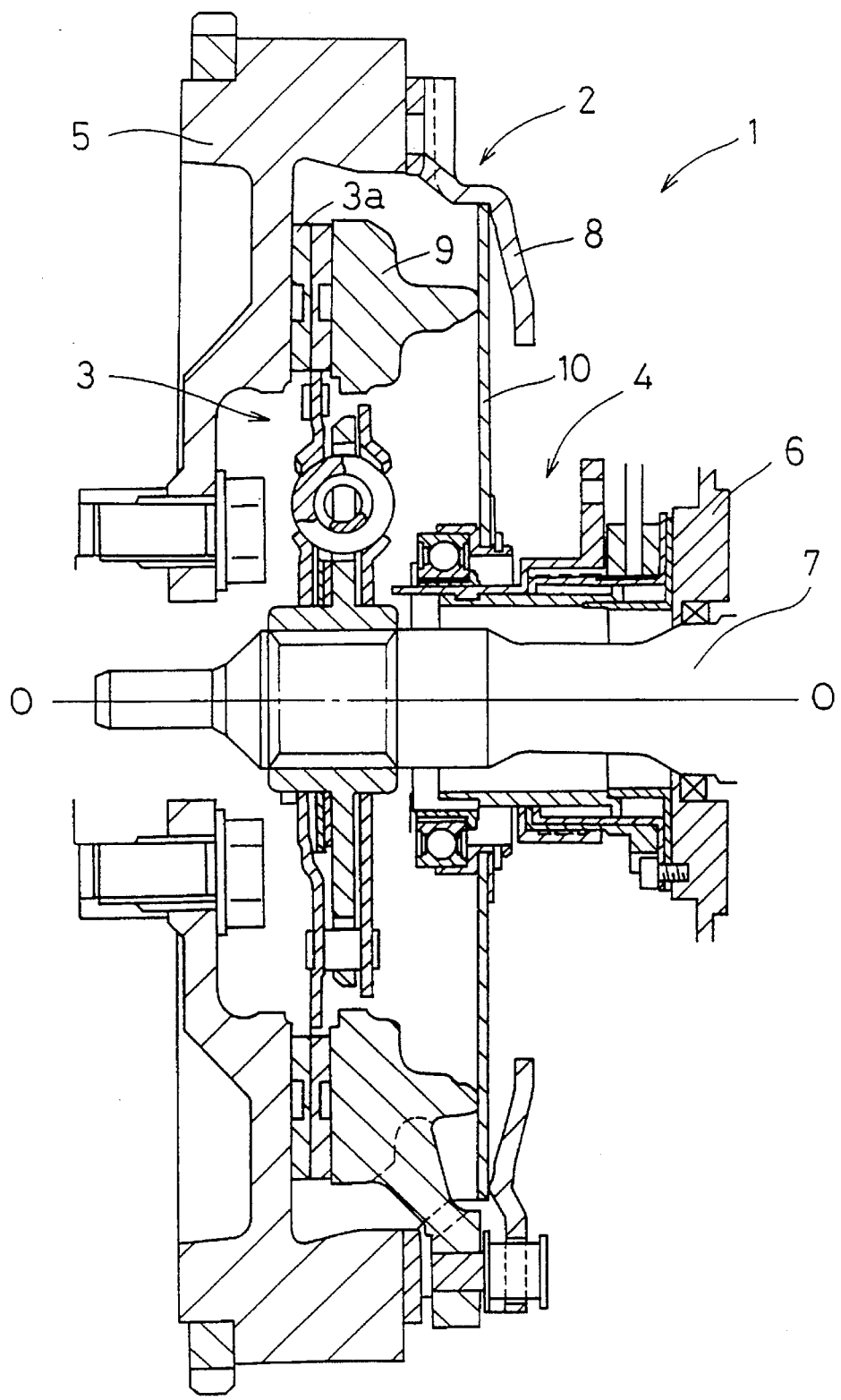
FIG. 1 is a fragmentary cross sectional view showing a pull-type clutch having a clutch release device which includes a release bearing assembly coupled to a bearing drive mechanism, in accordance with one embodiment of the present invention.
Figure 2:
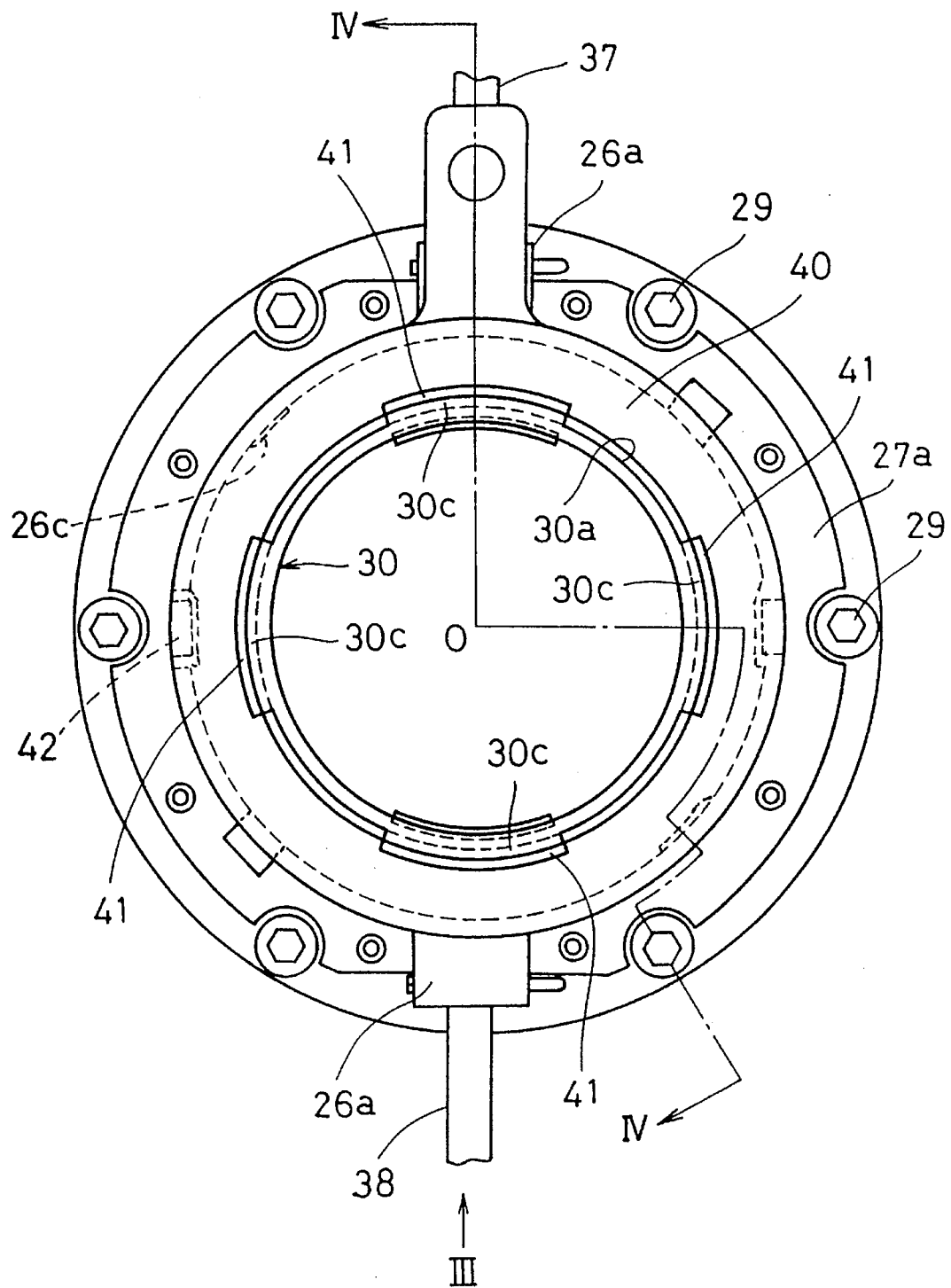
FIG. 2 is an end elevation view of the bearing drive mechanism, with some parts shown in phantom and other parts removed for clarity, shown removed from the pull type clutch depicted in FIG. 1, on a slightly enlarged scale.

FIG. 1 shows a pull-type clutch 1 in accordance with a preferred embodiment of the present invention. The pull-type clutch 1 is a device for engaging and dis-engaging a transmission from a flywheel 5 of an engine (not shown-on the left of FIG. 1) to a main drive shaft 7 extending from a housing 6 of a transmission (on the right of FIG. 1). In FIG. 1, line O—O denotes a center line of rotation by the pull-type clutch 1.

As can be seen, the pull-type clutch 1 includes a clutch cover assembly 2 attached to the flywheel 5 of the engine (not shown), a clutch disc 3 placed between the clutch cover assembly 2 and the flywheel 5, and a clutch release mechanism 4. An outer circumference of the pull-type clutch 1 is enclosed by a clutch housing (not shown).

The clutch cover assembly 2 includes a clutch cover 8 having its outer circumferential portion fixed to the flywheel 5, an annular pressure plate 9 placed inside the clutch cover 8, and a diaphragm spring 10. The diaphragm spring 10 is a thin disk-shaped element. The diaphragm spring 10 is provided with radial slits from an inner circumferential end in radial directions to an intermediate portion in the same directions, and lever portions is provided between adjacent ones of the slits. An annular portion formed in an outer circumference of the lever portion in the diaphragm 10 has its outer circumferential end supported by the clutch cover 8 and its inner circumferential end elastically pressing the pressure plate 9 toward the flywheel 5. The diaphragm spring 10 has its inner circumferential end coupled to the clutch release mechanism 4.

A front end of the main drive shaft 7 (in the center of FIG. 1) is formed with splines (not shown) which engage corresponding splines (not shown) formed within a center portion of the clutch disc 3. Close to an outer circumference of the clutch disc 3, annular friction facings 3a are provided. The friction facings 3a are placed between a friction surface of the flywheel 5 and a pressing surface of the pressure plate 9.

Figure 4:
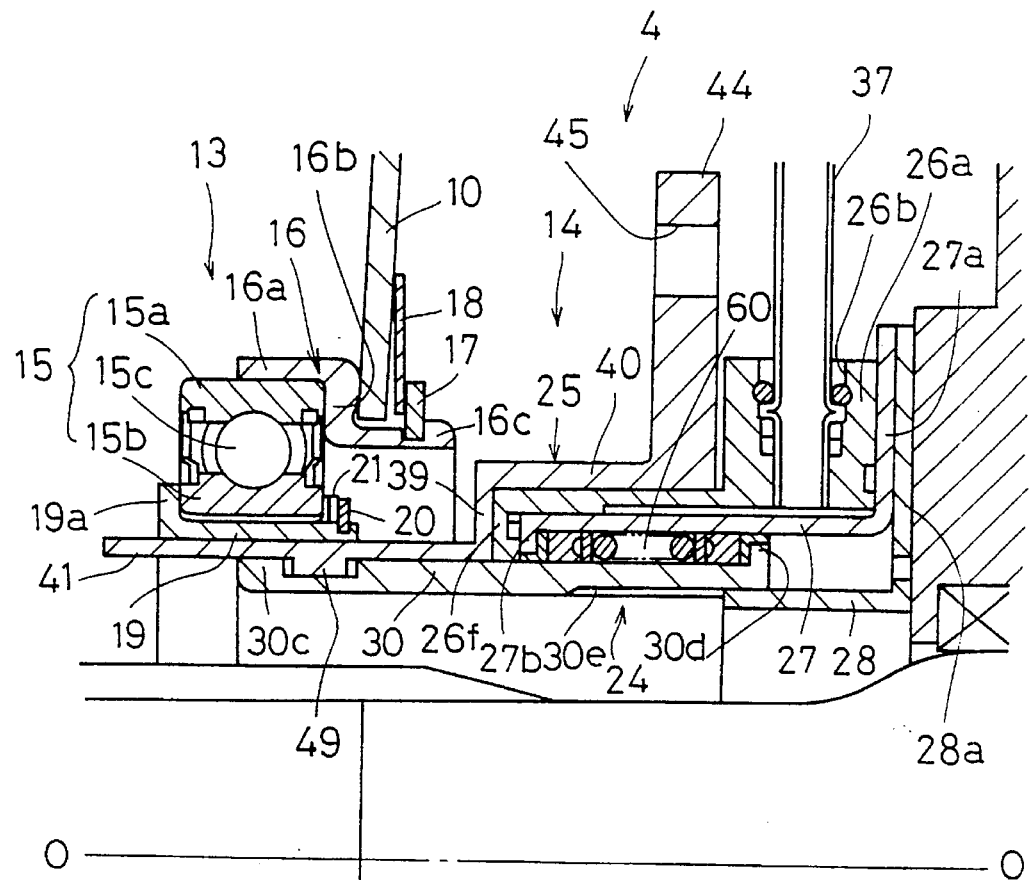
FIG. 4 is a fragmentary cross-section showing the bearing drive mechanism, release bearing assembly (not shown in FIG. 2 for clarity) and a portion of a transmission (not shown in FIG. 2 for clarity), taken along the line IV—IV in FIG. 2, on a slightly enlarged scale.
Figure 4:
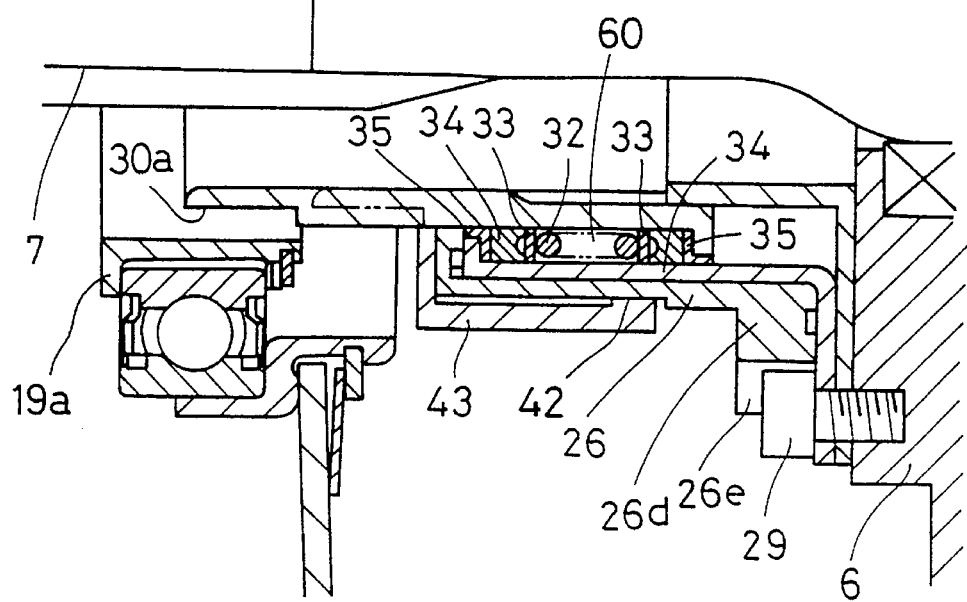

FIG. 4 depicts a configuration of the clutch release mechanism 4 in detail.

The clutch release mechanism 4 includes a release bearing mechanism 13 and a bearing drive mechanism 14. The release bearing mechanism 13 includes a release bearing 15, an outer cover 16, and an inner cover 19.

Figure 5:
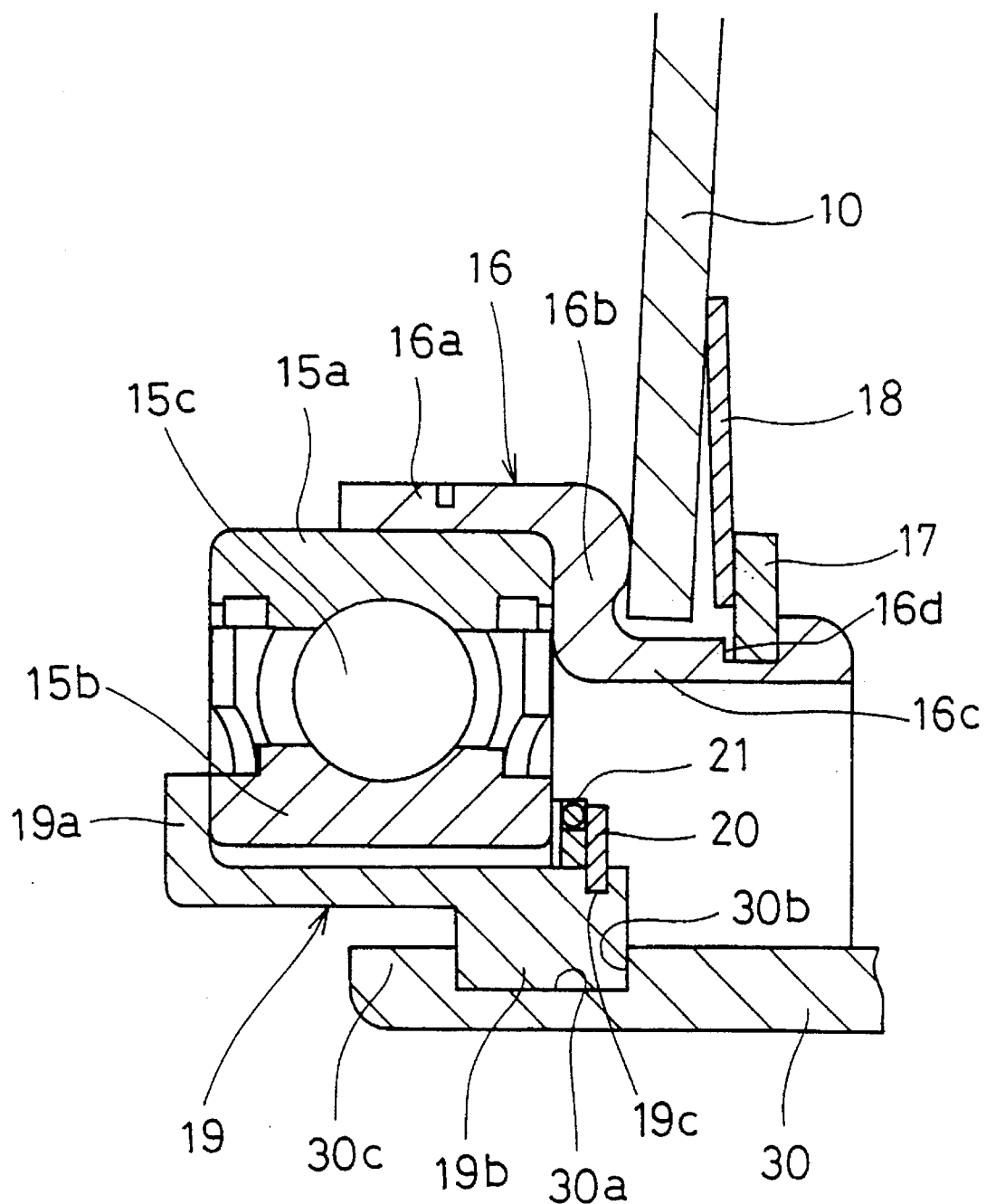
FIG. 5 is a fragmentary cross-section view showing a portion of FIG. 4 on a slightly enlarged scale.

As shown in FIG. 5, the release bearing 15 is formed with an outer race 15a, an inner race 15b, and a plurality of balls 15c disposed between both the races 15a and 15c.

The outer cover 16 is cylindrically shaped having a first cylinder portion 16a in contact with an outer circumferential surface of the outer race 15a, a ring portion 16b extending inward from the first cylinder portion 16a in radial directions to come in contact with an end surface of the outer race 15a close to the transmission, and a second cylinder portion 16c extending from the inside in the radial directions of the ring portion 16b toward the transmission. In an outer circumferential surface of the second cylinder portion 16c, an annular groove 16d extending in circular directions is formed, and a snap ring 17 is fitted in the groove 16d. Between the ring portion 16b and the snap ring 17, a tip of the lever of the diaphragm spring 10 and a cone spring 18 are placed. The cone-spring 18 has its inner circumferential end supported by the snap ring 17 and its outer circumferential end biased to engage the lever portion of the diaphragm spring 10.

The inner cover 19 is a cylindrical-shaped element which has a flange portion 19a extending outward in the radial directions at its end close to the clutch. The flange 19a comes in contact with an end surface of the inner race 15b close to the clutch. The inner cover 19 has its outer circumferential surface, toward the transmission housing 6, provided with an annular groove 19c extending in circular directions, and a snap ring 20 is fitted in the groove 19c. An annular elastic element 21 is placed between the snap ring 20 and an end surface of the inner race 15b close to the transmission. The opposite end surfaces of the inner race 15b are therefore confined within the inner cover 19 between the flange 19a and the annular elastic element 21. A predetermined gap is maintained between an inner circumferential surface of the inner race 15b and the outer circumferential surface of the inner cover 19.

Figure 6:
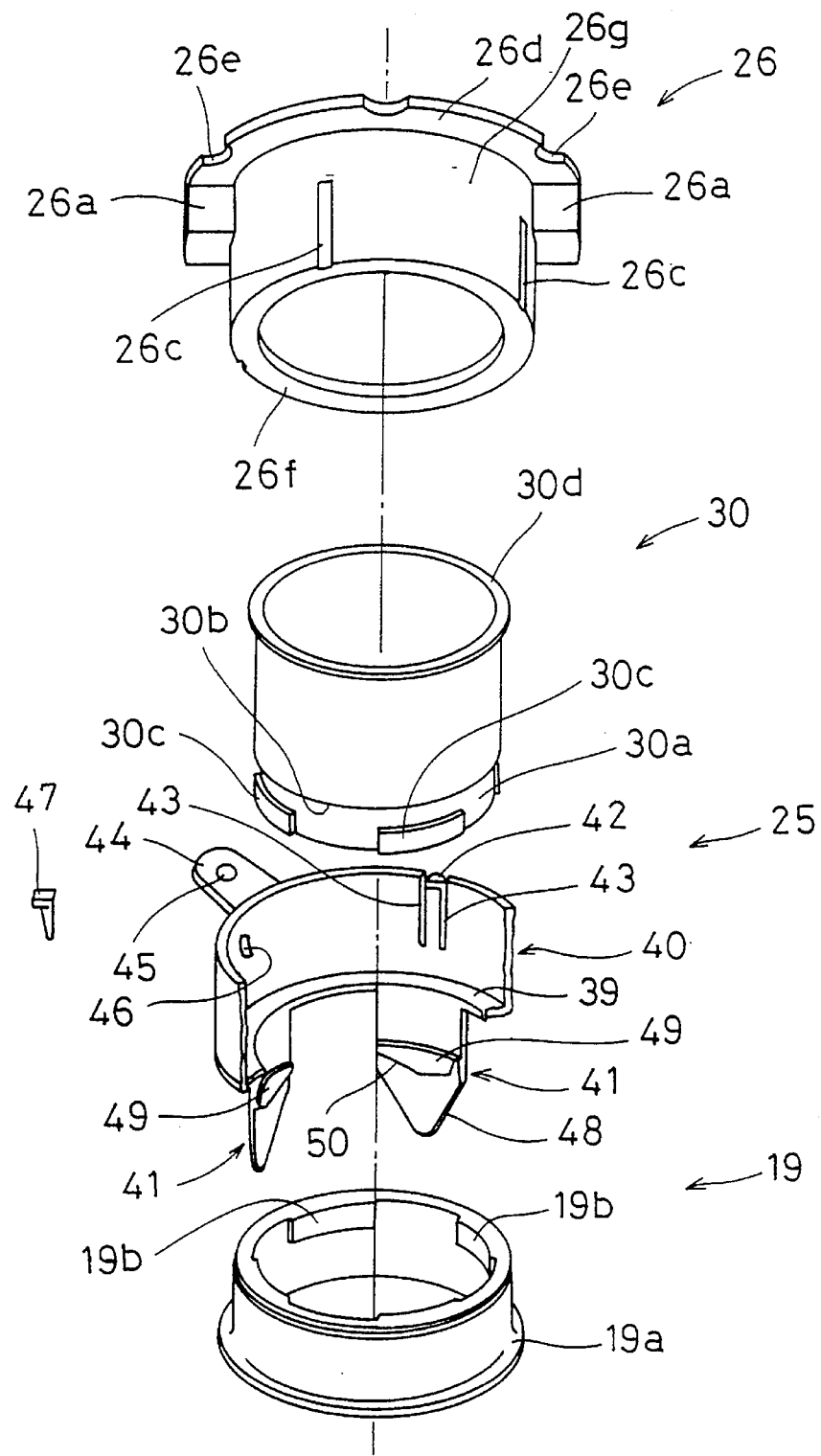
FIG. 6 is a fragmentary exploded view of portions of the clutch release mechanism.

There are four spaced apart first projections 19b formed in an inner circumferential surface of the inner cover 19, extending circumferentially and disposed at corresponding spaced apart intervals in the circular directions, as shown in FIG. 6. The first projections 19b engage the bearing drive mechanism 14, as is described in greater detail below.

The bearing drive mechanism 14 will now be described with reference to FIG. 4. The bearing drive mechanism 14 is primarily comprised of a hydraulic cylinder device 24 and an adapter 25.

The hydraulic cylinder device 24 is a slave cylinder actuated by hydraulic pressure applied from a master cylinder (not shown). The master cylinder is actuated by operating a clutch pedal (not shown). The hydraulic cylinder device 24 includes a connector 26, an outer circumferential wall 27, a restricting element 28, bolts 29 and an inner cylinder 30.

Figure 7:
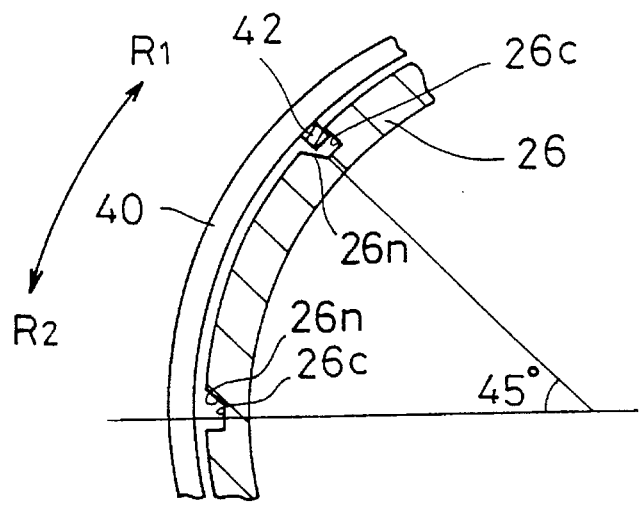
FIG. 7 is a fragmentary, sectional end view showing portions of an adaptor and a connector within the clutch release mechanism.

The connector 26, as is shown in FIGS. 2, 3, 4 and 6, is formed with a cylindrically shaped body 26g. The connector 26 has raised portions 26a extending radially outward and provided on opposed positions in radial directions in the outer circumferential surface of the cylindrically shaped body 26g. As is shown in FIG. 4, the raised portions 26a have holes 26b connected to a hydraulic pressure supply pipe 37 for supplying hydraulic pressure by means of the master cylinder (not shown) and to an air bleeding pipe 38, respectively. As shown in FIG. 5, two pairs of grooves 26c are formed in the cylindrically shaped body 26g which extend axially along the outer surface of the cylindrically shaped body 26g. The grooves 26c are positioned 45 degrees apart from each other, as shown in FIG. 7. Also shown in FIG. 7, the grooves 26c of each pair have one of their respective side walls notched to make an inclined surface 26n in positions opposed to each other.

With reference again to FIG. 6, the connector 26 has a flange 26d at one end close to the transmission, which extends radially outward. In an outer circumferential edge of the flange 26d, notches 26e are formed at uniform intervals in circular direction. In an end of the connector 26 closed to the clutch, a radially extending flange 26f is formed, as is shown in FIGS. 4 and 6.

The outer circumferential wall 27 (FIGS. 2 and 4) is a cylindrical element disposed within the inner circumference of the connector 26. The outer circumferential wall 27 has an outer flange 27a extending radially outward from its end close to the transmission. The outer flange 27a is in contact with an end surface of the connector 26 close to the transmission. The outer circumferential wall 27 also has an inner flange 27b protruding inward in the radial directions at its end close to the clutch. The inner flange 27b is in contact with the flange 26f of the connector 26. The outer circumferential wall 27 partially defines an oil chamber 60 of the hydraulic pressure cylinder device 24, and is provided with a hole (not shown) which is in fluid communication with the hole 26b in the connector 26.

The inner cylinder 30 also partially defines the oil chamber 60 of the hydraulic cylinder device 24. Since the inner cylinder 30 constitutes an inner wall of the oil chamber 60, the overall dimensions in radial directions of the hydraulic cylinder device 14 are minimized due to this configuration. The inner cylinder 30 is smaller in diameter than the outer circumferential wall 27, and the oil chamber 60 is defined between the inner cylinder 30 and the outer circumferential wall 27. An outer circumferential surface of the inner cylinder 30 comes slidably in contact with the flange 26f of the connector 26.

Figure 10:
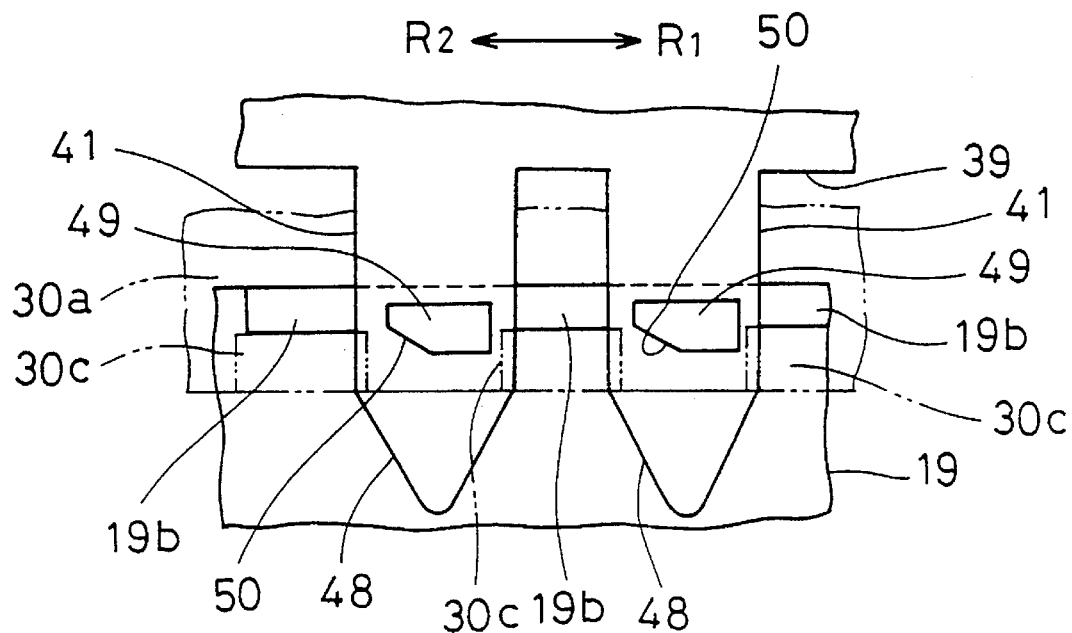
FIG. 10 is a fragmentary side view, similar to FIGS. 8 and 9, showing an assembling operation of portions of the clutch release mechanism.

As shown in FIG. 4, the inner cylinder 30 extends into the inner cover 19. As is shown in FIGS. 4 and 6, a surface 30a having a diameter smaller than that of the remainder of the inner cylinder 30 is formed. Further, there are four of second projections 30c which protrude outwardly from the surface 30a and which are disposed at the spaced apart intervals in the circular directions on the surface 30a. Each of gaps in circular directions between adjacent ones of the second projections 30c is larger than the distance in the circular directions between each of the first projections 19b in the inner cover 19. Thus, the first projections 19b can pass between the second projections 30c during assembly and disassembly. During assembly and dis-assembly, the first projections 19b are placed in gaps in axial directions between the second projections 30c and an end 30b of the surface 30a, as shown in FIG. 10. Engagement of the second projections 30c with the first projections 19b prevents the inner cover 19 from moving relative to the inner cylinder 30 in the axial directions. Especially, it prevents the inner cover 19 and the inner cylinder 30 from vibrating and rattling in the axial directions.

A flange 30d, extending radially outward, is formed at an end of the inner cylinder 30 close to the transmission, as is shown in FIG. 4. A recessed surface 30e is formed in an inner circumferential surface of the inner cylinder 30 close to the transmission near the flange 30d.

In the oil chamber in the hydraulic cylinder device 24, a preload spring 32 is placed. Annular spring seats 33, seal elements 34 and contact elements 35 are displaced on opposite ends of the spring 32, respectively. The contact elements 35 are in contact with the flange 30d of the inner cylinder 30 and the inner flange 27b of the outer circumferential wall 27, respectively. In such a configuration as mentioned above, the spring 32 urges the inner cylinder 30 toward the transmission always with low load. Urging force by the spring 32 results in the release bearing 13 being pre-loaded toward the transmission with the inner cover 19 and other elements interceding with them.

The restricting element 28 is a cylindrical element placed inside the inner cylinder 30 as shown in FIG. 4. The restricting element 28 has a radially outwardly extending flange 28a. The flange 28a and the outer flange 27a of the outer circumferential wall 27 are fixed to the housing 6 by the bolts 29. The restricting element 28 is fitted within the inner cylinder 30, contacting the surface 30e. Thus, the inner cylinder 30 is restricted in movement toward the transmission.

Figure 8:
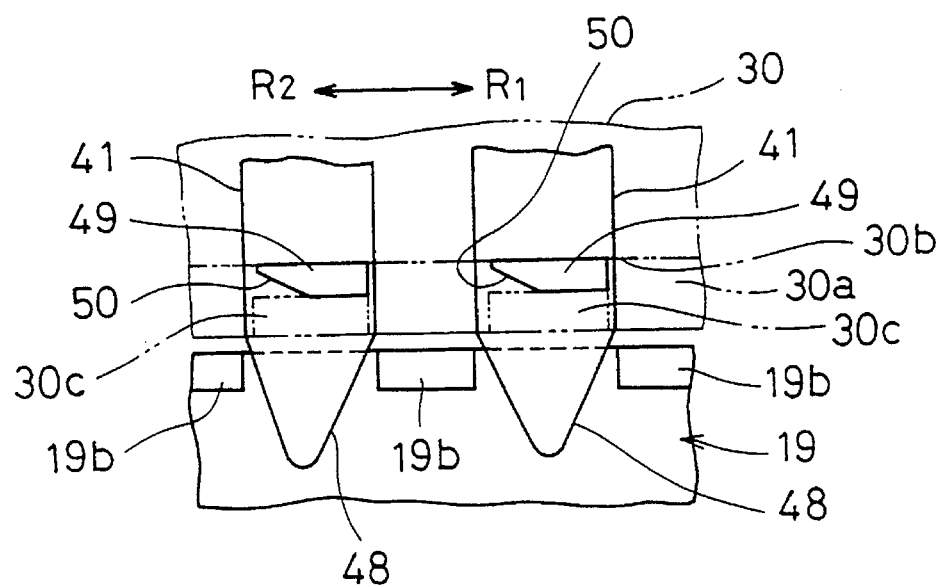
FIG. 8 is a fragmentary side view of a portion of the bearing assembly depicted in FIG. 6, showing an assembling operation of portions of the clutch release mechanism.
Figure 9:
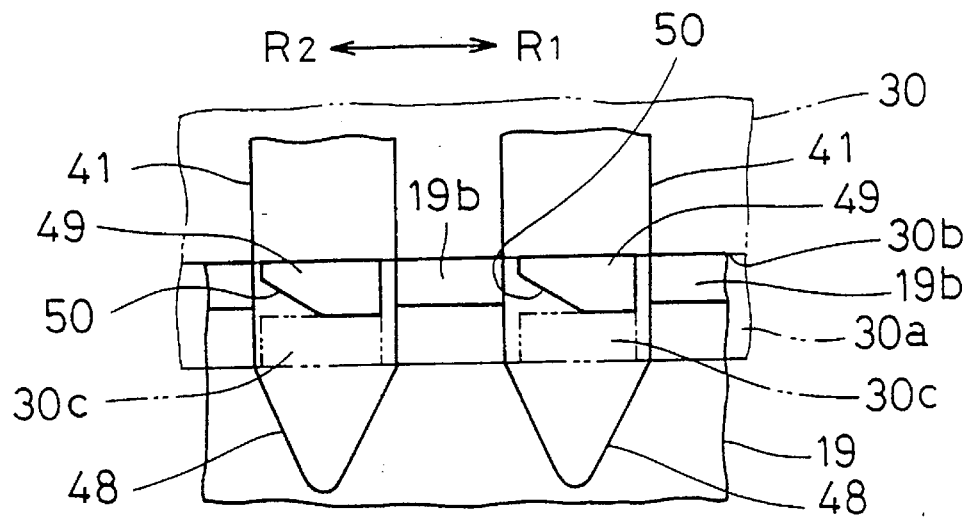
FIG. 9 is a fragmentary side view, similar to FIG. 8, showing an assembling operation of portions of the clutch release mechanism.

The adaptor 25, as shown in FIGS. 6, 8, 9 and 10, is an annular element disposed about portions of the inner cylinder 30 and an outer circumference of the connector 26. The adaptor 25 primarily includes of a cylinder portion 40 and a plurality of axially extending guides 41. The cylinder 40 and the guides 41 are unitarily formed with a ring portion 39 formed therebetween. The ring portion 39 extends radially inward from an end of the cylinder 40 close to the clutch. The cylinder 40 contacts an outer circumferential surface of the connector 26 and the ring portion 39 comes in contact with an end surface of the flange 26f. In an end of the cylinder 40 close to the clutch, as shown in FIG. 6, there are two projections 42 which extend radially inward. The projections 42, as shown in FIG. 7, correspond to and extend into grooves 26c in the connector 26. On opposite sides of the projections 42, slits 43 are provided. This allows the projections 42 to elastically transform in a radial direction, and the projections 42 proceeding beyond the grooves 26c move on an outer circumferential surface of the connector 26 and fitted in the grooves 26c. The projections 42 are allowed to move in circular directions between each pair of the grooves 26c but not beyond either of the grooves. Referring to FIG. 8 to FIG. 10, $R_1$ designates a direction of the rotation of the engine while $R_2$ designates a reverse direction.

Figure 3:
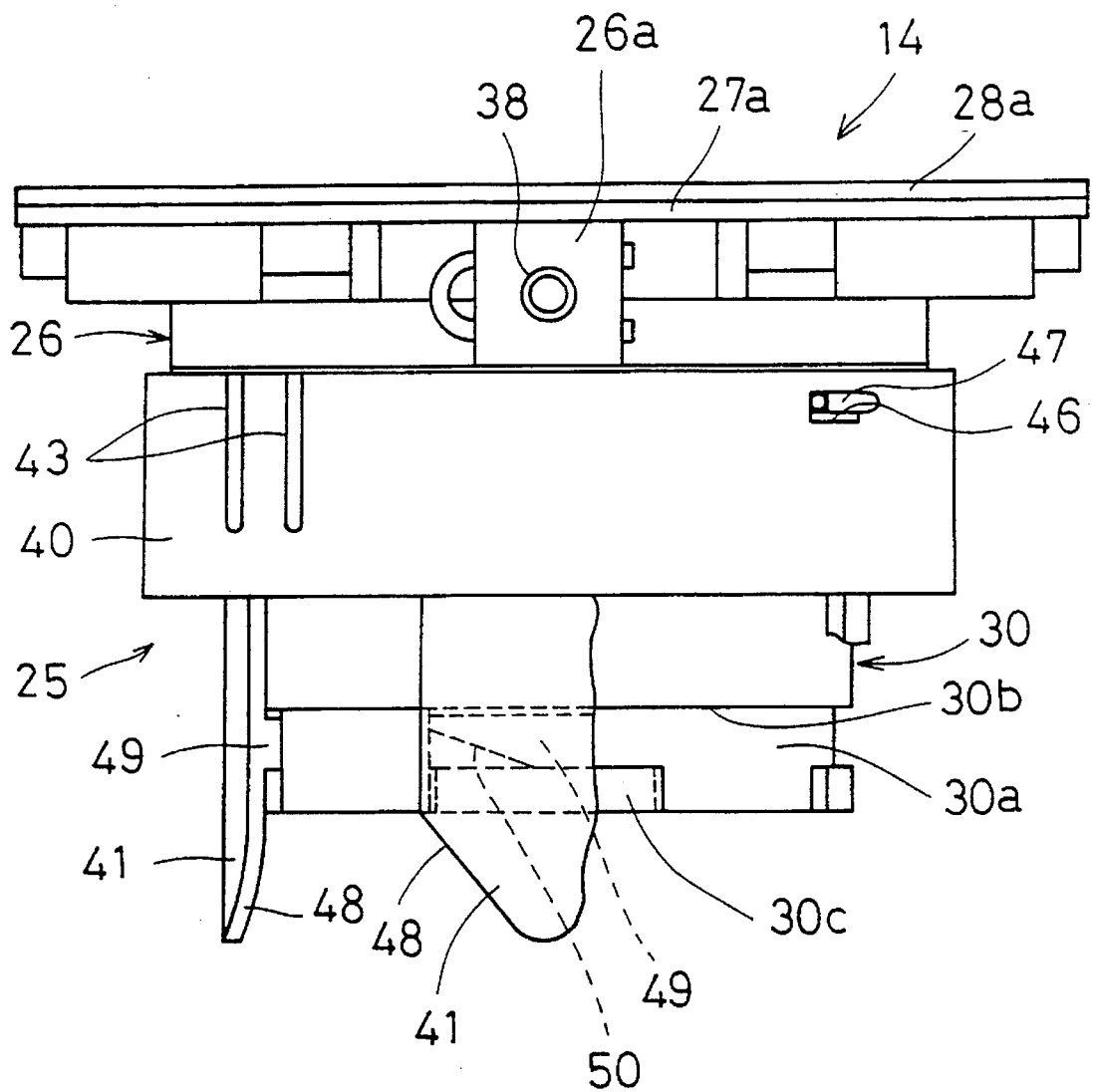
FIG. 3 is a side elevation, and part cut-away view showing the bearing drive mechanism depicted in FIG. 2, looking in the direction of the arrow III in FIG. 2

A notch 46, shown in FIGS. 3 and 6, is formed in the cylinder 40, and a wedge 47 inserted in the notch 46 between the cylinder 40 and the connector 26. When the adaptor 25 is rotated in one direction after insertion of the wedge 47, the adaptor 25 engaging the connector 26 is wedged immovable between the outer surface the connector 26 and the inner surface of the cylinder portion 40. Further, the wedge 47 may engage one of the groves 26c to prevent rotation of the connector 26 with respect to the cylinder portion 40 until such time as the wedge is loosened, for instance for replacement of the clutch disc 3 as is described in greater detail below.

In an end of the cylinder 40 close to the clutch, a projection 44 extending outward in a radial direction is provided, A hole 45 extending through the projection 44 in axial directions is formed.

As can be seen in FIG. 6, each of the guides 41 is curved in circular directions, and four guides 41 are disposed at predetermined spaced apart intervals in the circular directions on the ring portion 39. As shown in FIG. 10, when the various components of the present invention are assembled, the guides 41 are disposed in between the first projections 19b, and the adapter 25 and the inner cover 19 cannot be rotated relative to each other. The end of each of the guides 41 is formed with an inclined surface 48 which become narrower toward distal ends. In inner circumferential surfaces of the guides 41, third projections 49 are formed, one third projection 49 formed on each guide 41. The third projections 49 extend in circular directions and have inclined surfaces 50 which become gradually narrower as they go toward distal ends on the side in the $R_2$ direction. The inclined surfaces 50 allow the third projections 49 to smoothly move to gaps between the second convey portions 30c and the end 30b in axial directions when the adaptor 25 is rotated in the $R_2$ direction from the state depicted in FIG. 10.

Since an inner diameter of the second cylinder 16c in the outer cover 16 is larger than an outer diameter of the cylinder 40, the inner cover 19 can be moved in axial directions till its end surface close to the transmission comes in contact with the ring 39 of the adaptor 25. Thus, a dimension in the axial directions of the clutch release mechanism 4 is minimized.

An operation of the device will be described below.

The diaphragm spring 10 presses the pressure plate 9 toward the flywheel 5 and brings the friction facing 3a of the clutch disc 3 in press contact with the flywheel 5. Torque from the flywheel 5 is transmitted to the clutch disc 3 and is further applied toward the transmission via the main drive shaft 7.

When the driver pushes a clutch pedal, hydraulic fluid is supplied from the master cylinder not shown via the hydraulic pressure supply pipe 37 to the oil chamber in the hydraulic cylinder device 24. In this way, the inner cylinder 30 moves toward the transmission, and this causes the release bearing 15 to draw the lever portions of the diaphragm spring 10 toward the transmission. Consequently, pressing force by the diaphragm spring 10 against the pressure plate 9 is released, and this disengages the pressure plate 9 from the friction facing 3a. Under such a circumstance, the torque is not transmitted toward the transmission.

When the driver releases his foot from the clutch pedal, hydraulic pressure pushing the inner cylinder 30 toward the transmission is released from the hydraulic cylinder device 24. Hence, the diaphragm 10 causes the pressure plate 9 to move toward the flywheel 5, and the friction facing 3a in the clutch disc 3 is held between the flywheel 5 and the pressure plate 9.

As the friction facing 3a of the clutch disc 3 experiences wear and its thickness is reduced, in the clutch engagement state, the pressure plate 9 moves toward the flywheel 5. As a result, a tip of the lever of the diaphragm spring 10 moves toward the clutch, and this causes the release bearing 15 and the inner cylinder 30 to move toward the clutch. As the inner cylinder 30 moves, the end 30b comes into contact with the third projections 49 in the adaptor 25 and moves the adaptor 25 toward the clutch. In this way, a roughly fixed distance in axial directions from an end surface of the inner cover 19 close the transmission to the ring 39 of the adaptor 25 (release length) is maintained.

In disassembling the transmission from the engine, the adaptor 25 must be turned in one direction, which causes the adaptor 25 to be wedged immovable relative to the connector 26 in axial directions. Thus, in disassembling the transmission, the adaptor 25 is fixed to the connector 26 so a worn clutch disc can be removed and replaced, and after reassembling the clutch disc, the adaptor 25 is in position to manage further wear of the friction facing 3a. Thus, there is no need to adjust the position of the adaptor 25 in axial directions in reassembling the clutch disc.

A procedure of assembling the clutch release mechanism 4 will be described below.

In advance, the release bearing mechanism 13 is fixed in an inner circumferential end of the diaphragm spring 10 while the bearing drive mechanism 14 is fixed to the housing 6. Before assembling, the projections 42 of the adapt 25 are fitted in the grooves 26c on the side of $R_2$ in the connector 26. This, as shown in FIG. 8, results in the adaptor 25 having the third projections 49 placed between the second projections 30c and the end 30b in the inner cylinder 30 in axial directions. Hence, the adaptor 25 engages the inner cylinder 30 so as not to move in the axial directions. Under such a circumstance, gaps in the circular directions between adjacent ones of the guides 41 corresponds to gaps in circular directions between adjacent ones of the second projections 30c.

The adaptor 25 along with the transmission housing 6 is moved toward the clutch, so that the guides 41 may be inserted in the inner cover 19. At this time, the first projections 19b in the inner cover 19 are guided by the inclined surfaces 48 formed in the guides 41 to smoothly enter the gaps between adjacent guides 41. As the adaptor 25 and housing 6 are further moved, the first concave projections 19b extend into gaps in the circular directions between adjacent second projections 30c and move in axial directions till coming in contact with the end 30b of the surface 30a in the inner cylinder 30 as shown in FIG. 9. Since each of the gaps between second projections 30c is larger than the width of the gaps between each of the first projections 19b, the first projections 19b smoothly move. With reference now to FIG. 9, when the adaptor 25 is rotated toward the $R_1$ direction with a screwdriver or other tool inserted in the hole 45 in the projection 44, the inner cylinder 30 is guided by the restricting element 28 so as to be movable in axial directions but not be relatively rotatable; hence, the third projections 49 are rotated from the gap between the second projections 30c and the end 30b. Further, with the guides 41 extending between adjacent first projections 19b, the inner cover 19 rotates with the adaptor 25. As the inner cover 19 rotates, the first projections 19b are inserted into the gap between the second projections 30c and the end 30b. This causes the first projections 19b and the second projections 30c to engage with each other in axial directions (see FIG. 10). During the rotation, the projections 42 of the adaptor 25 move from the grooves 26c on the side of $R_2$ to the grooves 26c on the side of $R_1$ to return to the state as shown in FIG. 7.

An operation of disassembling the clutch release mechanism 4 will be described below.

For disassembly, the adaptor 25 is rotated-toward the side of $R_2$ under the circumstance depicted in FIG. 10. This results in the inclined surfaces 50 of the third projections 41 being smoothly inserted into the gaps between the second projections 30c and the end 30b while in contact with the second projections 30c. At this time, the first projections 19b and the second projections 30c become disengaged from each other. After that the adaptor 25 and inner cylinder 30 along with the housing 6 are moved toward the transmission, and thus, disengaging the release bearing mechanism 13 from the bearing drive mechanism is completed.

As has been described, operability in engagement and disengagement of the inner cover 19 and the inner cylinder 30 is greatly enhanced because the first projections 19b and the second projections 30c are simple in configuration. In addition to that, the adaptor 25 is useful for enhancing rotation of the inner cover 19 and operability of the guides and other elements in the first concave projections 19b. Especially, the projection 44 in the radial direction provided with the hole 45 effectively enhances rotation operability of the inner cover 19, and therefore, there is no need of providing an operating element such as a projection in the inner cover 19.

In the embodiment as mentioned above, there is no special tool assembling and disassembling the release bearing mechanism 13 and the bearing drive mechanism 14. Thus, a space in axial directions for mounting the tool is unnecessary. Additionally, although a large hole is formed in a clutch housing to take out such a tool in the prior art, a small service hole is enough for insertion of a tool for manipulating the adaptor 25 in the present invention.

EFFECTS OF THE INVENTION

In a release coupling device according to the present invention, since engagement of a first concave projections with a second projections can be done by bringing the first projections of an annular element in contact with the second projections of a cylindrical element close to a clutch, attachment and detachment of the device is facilitated, and workability is enhanced.

In the event of having a plurality of the first projections and second projections portions formed in circular directions, the workability is further enhanced since the device can be attached and detached simply by relatively moving the annular element in axial directions and then turning it. In the event that the gaps between adjacent ones of the second projections in circular directions are larger than a width in circular directions of each of the first projections workability in attaching and detaching the device is enhanced because the first projections can easily pass the gaps in the circular directions between the second projections portions.

In the event that the first projections are disposed between the second projections and an end of a small surface of the cylindrical element, rattle of the cylindrical element and the annular element in the axial directions is prevented.

Further including an annular coupling element which engages the annular element so as not to rotate relative to each other, the coupling element facilitates rotation of the annular element, and therefore, there is no need of forming an extra element such as a projection in the annular element. In the event that the coupling element has an operating element which extends outward in a radial direction, a rotating operation of the annular element by the coupling element is facilitated. In the event that the coupling element has a plurality of guides, the first projections are smoothly guided into the gaps in the circular directions between adjacent ones of the second projections. This enhances workability in assembling the device. In the event that the guides have their respective distal ends shaped narrower in circular directions than their respective proximal ends, the first projections are more smoothly guided into the gaps in the circular directions between the second projections. In the event that third projections are formed in inner circumferential surfaces of the guides, fitting the third in gaps in axial directions between the second projections and the end of the small surface permits the coupling element and the cylindrical element to be put in position in the axial directions. This leads to enhancement of workability in attaching and detaching the device.

In the event that the third projections have inclined surfaces at their respective one ends in one of circular directions, turning the coupling element for disengagement causes the inclined surfaces of the third projections to be in contact with the second projections, so that the third projections are smoothly put in the gaps in the axial directions between the second projections and the end of the small surface. In this way, workability in detachment is enhanced.

In the event of further including a restricting element which restricts movement of the coupling element and the cylindrical element in the axial directions, the coupling element can be fixed to the cylindrical element in the axial directions since relative movement in the axial directions of the coupling element and the cylindrical element is restricted. In the event that the restricting element is a wedge element, relative movement in the axial directions between the coupling element and the cylindrical element can be restricted or be released from restriction.

In the event that the device further includes a cylindrical fixing element and that the annular element and the fixing element engage with each other so that guides of the annular element may be arranged in first and second positions in circular directions, the first projections interposed between adjacent ones of the guides are brought in gaps between adjacent ones in circular direction of the second projections to be disengaged from the second projections portions when the annular element is moved from the first position to the second position in disassembling the device. In assembling the device, the annular element is put in the second position, and thereafter, the first projections in the annular element are inserted in axial directions in gaps between adjacent ones of the first projections in the circular directions. Under the circumstances, the first projections smoothly pass the gaps between adjacent ones of the second projections in the circular directions. When the annular element is turned to the second position, the first projections are disposed between the second projections and the end. AS has been described, shifting the annular element between the first and second positions facilitates engaging and disengaging operations. In the event that engagement allows the annular element to move between the first and second positions in the circular directions relative to the fixed element and that it prevents the annular element from moving beyond the first and second positions in the circular directions, good workability is attained since the annular element keeps a track between the first and second positions. In the event that the engagement is attained by mating a single projection in the annular element and a pair of grooves in the cylindrical fixing element, the projection moves between the pair of the grooves in circular directions. This enhances workability with a simple configuration, In the event that slits extending from an end surface close to the transmission in axial directions are formed on opposite sides of the projection in the circular directions, the projection elastically deforms as it going out of the pair of the groves moves on the cylindrical fixing element. In the event that inclined surfaces are formed on one of walls of the grooves opposed to each other so that the projection can proceed the grooves, the annular element can easily move between the first and second positions.

In a clutch release mechanism according to the present invention, When a release bearing drive mechanism causes a cylindrical element to move toward a transmission, a second urges a first projection so that the first projection causes an annular element to move toward the transmission. This results in a release bearing moving toward the transmission to cause disengagement of a clutch. Engagement of the first projections and second projections brings a first convex portion in the annular element in contact with a second projections in the cylindrical element close to the clutch. This facilitates attachment and detachment of the device and enhances workability.

In the event of employing a hydraulic cylinder device as a drive mechanism, the hydraulic cylinder device causes the cylindrical element in axial directions to release the clutch. In the event that the cylindrical element constitutes an inner circumferential wall in an oil chamber, a dimension in a radial direction of the clutch release mechanism can be diminished.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A release coupling apparatus for a clutch release bearing assembly, comprising:

a release bearing assembly engageable with a diaphragm spring of a clutch mechanism;

an annular element engaging a first axial end of said release bearing, having a first projection formed on an inner circumferential surface; and a cylindrical element having a second projection in its outer circumferential surface insertable into said annular element and releaseably engageable with said first projection;

a cylindrical shaped coupling element disposed around said cylindrical element and at least partially within said annular element, engaging an inner portion of said annular element restricting relative rotation between said coupling element and said annular element;

wherein said coupling element further comprises at least one radially extending portion having an aperture formed therein.

2. A release coupling apparatus as in claim 1, wherein said cylindrical element is formed with two outer circumferential surfaces, a first of said outer circumferential surfaces having a smaller diameter than a second of said outer circumferential surfaces, said second projection being formed on said first of said outer circumferential surfaces.

3. A release coupling apparatus for a clutch release bearing assembly, comprising:

a release bearing assembly engageable with a diaphragm spring of a clutch mechanism;

an annular element formed with a plurality of circumferentially spaced apart first projections, said annular element engaging a first axial end of said release bearing;

a cylindrical element formed with a plurality of circumferentially spaced apart second projections on its outer circumferential surface, said cylindrical element being insertable into said annular element and said second projections being releaseably engageable with said first projections;

a cylindrically shaped coupling element disposed around said cylindrical element and at least partially within said annular element engaging an inner portion of said annular element restricting relative rotation between said coupling element and said annular element, said coupling element also having a plurality of axially extending guide portions which are disposed between said first projections for guiding said first projections into gaps defined between adjacent ones of said second projections; and wherein each of said guide portions further comprises a distal end having a tapered portion.

4. A release coupling apparatus as in claim 3, wherein said second projections are disposed at spaced apart intervals, the intervals being larger than a circumferential width between each of said plurality of said first projections.

5. A release coupling apparatus as in claim 3, wherein said cylindrical element is formed with two outer circumferential surfaces, a first of said outer circumferential surfaces having a smaller diameter than a second of said outer circumferential surfaces, said second projections being formed on said first of said outer circumferential surfaces.

6. A release coupling apparatus for a clutch release bearing assembly, comprising:

a release bearing assembly engageable with a diaphragm spring of a clutch mechanism;

an annular element engaging a first axial end of said release bearing, said annular element formed with a plurality of circumferentially spaced apart first projections, said annular element engaging a first axial end of said release bearing;

a cylindrical element formed with a plurality of circumferentially spaced apart second projections on its outer circumferential surface, said cylindrical element being insertable into said annular element and said second projections being releaseably engageable with said first projections;

a cylindrically shaped coupling element disposed around said cylindrical element and at least partially within said annular element, engaging an inner portion of said annular element restricting relative rotation between said coupling element and said annular element, said coupling element also having a plurality of axially extending guide portions which are disposed between said first projections for guiding said first projections into gaps defined between adjacent ones of said second projections;

wherein each of said guide portions further comprises a third projection formed on an radially inner surface, each of said third projections configured to fit into corresponding gaps defined between said second projections and an annular radially extending surface of said cylindrical element adjacent to said second projections.

7. A release coupling apparatus as in claim 6, wherein each of said third projections is formed with an inclined surface.

8. A release coupling apparatus as in claim 6, wherein said second projections are disposed at spaced apart intervals, the intervals being larger than a circumferential width between each of said plurality of said first projections.

9. A release coupling apparatus as in claim 6, wherein said cylindrical element is formed with two outer circumferential surfaces, a first of said outer circumferential surface having a smaller diameter than a second of said outer circumferential surfaces, said second projection being formed on said first of said outer circumferential surfaces.

10. A release coupling apparatus for a clutch release bearing assembly, comprising:

a release bearing assembly engageable with a diaphragm spring of a clutch mechanism;

an annular element engaging a first axial end of said release bearing, having a first projection formed on an inner circumferential surface; and a cylindrical element having a second projection in its outer circumferential surface insertable into said annular element and releaseably engageable with said first projection;

a restricting element having a wedge interposed between an inner circumferential surface of said coupling element and an outer circumferential surface of said cylindrical element.

11. A release coupling apparatus as in claim 10, wherein said cylindrical element is formed with two outer circumferential surfaces, a first of said outer circumferential surfaces having a smaller diameter than a second of said outer circumferential surfaces, said second projection being formed on said first of said outer circumferential surfaces.

12. A release coupling apparatus for a clutch release bearing assembly comprising:

a release bearing assembly engageable with a diaphragm spring of a clutch mechanism;

an annular element engaging a first axial end of said release bearing, having a first projection formed on an inner circumferential surface; and a cylindrical element having a second projection in its outer circumferential surface insertable into said annular element and releaseably engageable with said first projection;

a cylindrically shaped coupling element disposed around said cylindrical element and at least partially within said annular element engaging an inner portion of said annular element restricting relative rotation between said coupling element and said annular element; and a cylindrically shaped connecting element extending at least partially around said cylindrical element and further at least partially extending into said coupling element, said connecting element and said cylindrical element defining a hydraulically actuated displacement mechanism where an inner surface of said connecting element and an outer surface of said cylindrical element define a hydraulic cylinder chamber.

13. A release coupling apparatus as in claim 12, wherein said coupling element further comprises at least one radially inwardly extending protrusion and said connecting element includes at least two axially extending grooves formed on an outer surface of said connecting element such that said radially inwardly extending protrusion selectively engages a either of said grooves.

14. A release coupling apparatus as in claim 13, wherein said coupling element further comprises a plurality of axially extending guide portions which are disposed between said first projections for guiding said first projections into gaps defined between adjacent ones of said second projections, and said radially inwardly extending protrusion is in axial alignment with one of said axially extending guide portions.

15. A release coupling apparatus according to claim 14, wherein said radially inwardly extending protrusion and said grooves are configured such that relative rotation between said coupling element and said cylindrical connecting element is restricted by engagement of said radially inwardly extending protrusion with each of said grooves.

16. A release coupling apparatus according to claim 15, wherein each of the grooves is provided with an inclined surface, the inclined surfaces circumferencially adjacent to one another.

17. A release coupling apparatus as in claim 12, wherein said second projections are disposed at spaced apart intervals, the intervals being larger than a circumferential width between each of said plurality of said first projections.

18. A release coupling apparatus as in claim 12, wherein said cylindrical element is formed with two outer circumferential surfaces, a first of said outer circumferential surfaces having a smaller diameter than a second of said outer circumferential surfaces, said second projections being formed on said first of said outer circumferential surface.

19. A release coupling apparatus comprising:

a cylindrically shaped connecting element disposable around an input shaft of a transmission;

a cylindrical element having a portion at least partially disposed within said cylindrically shaped connecting element for axial displacement therewith, said connecting element and said cylindrical element defining a hydraulically actuated displacement mechanism where an inner surface of said connecting element and an outer surface of said cylindrical element define a hydraulic cylinder chamber;

an annular element engageable with a release bearing, having a first projection formed on an inner circumferential surface;

wherein said cylindrical element having a second projection in its outer circumferential surface insertable into said annular element and releaseably engageable with said first projection;

a cylindrically shaped coupling element disposed around said cylindrical element and at least partially within said annular element engaging an inner portion of said annular element restricting relative rotation between said coupling element and said annular element;

wherein said coupling element further comprises at least one radially inwardly extending protrusion and said connecting element includes at least two axially extending grooves formed on an outer surface of said connecting element such that said radially inwardly extending protrusion selectively engages either of said grooves.

20. A release coupling apparatus as in claim 19, wherein said cylindrical element is formed with two outer circumferential surfaces, a first of said outer circumferential surfaces having a smaller diameter than a second of said outer circumferential surfaces, said second projection being formed on said first of said outer circumferential surfaces.

* * * * *

UNITED STATES PATENT AND TRADEMARK OFFICE
CERTIFICATE OF CORRECTION

PATENT NO. : 5,598,912
DATED : February 4, 1997
INVENTOR(S) : Norihisa UENOHARA

It is certified that error appears in the above-indentified patent and that said Letters Patent is hereby corrected as shown below:

Item [30]

Title page --FOREIGN APPLICATION PRIORITY DATA should read--

June 3, 1994 (JP) JAPAN ............ 6-122842--

Signed and Sealed this

Twenty-ninth Day of July, 1997

Attest:

Attesting Officer

BRUCE LEHMAN

Commissioner of Patents and Trademarks